(12) United States Patent
Popp et al.

(10) Patent No.: US 7,946,630 B2
(45) Date of Patent: May 24, 2011

(54) HYDRAULIC SYSTEM

(75) Inventors: Udo Popp, Buehl (DE); Roland Welter, Buehl (DE); Matthias Zink, Ottenhoefen (DE); Rudolf Hoenemann, Ottersweiler (DE); Markus Heitbaum, Buehlertal (DE); Urban Panther, Seelbach (DE); Jan Grabenstaetter, Gemsbach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1074 days.

(21) Appl. No.: 10/514,400

(22) PCT Filed: May 13, 2003

(86) PCT No.: PCT/DE03/01513
§ 371 (c)(1),
(2), (4) Date: May 26, 2005

(87) PCT Pub. No.: WO03/095846
PCT Pub. Date: Nov. 20, 2003

(65) Prior Publication Data
US 2005/0217265 A1 Oct. 6, 2005

(30) Foreign Application Priority Data
May 14, 2002 (DE) .................................. 102 21 268

(51) Int. Cl.
*F16L 37/00* (2006.01)

(52) U.S. Cl. ........................................................ 285/305
(58) Field of Classification Search ............... 285/293.1, 285/305, 319
See application file for complete search history.

(56) References Cited

U.S. PATENT DOCUMENTS

| 4,884,829 | A | * | 12/1989 | Funk et al. ..................... 285/305 |
| 5,681,060 | A | | 10/1997 | Berg et al. |
| 5,887,912 | A | * | 3/1999 | Nakamura .................. 285/293.1 |
| 6,176,523 | B1 | | 1/2001 | Winslett |
| 6,454,314 | B1 | * | 9/2002 | Grosspietsch et al. ........ 285/319 |
| 6,572,154 | B1 | * | 6/2003 | Niemiec ........................ 285/305 |
| 2001/0025489 | A1 | | 10/2001 | Bockling et al. |
| 2002/0084652 | A1 | | 7/2002 | Halbrock et al. |

FOREIGN PATENT DOCUMENTS

| DE | 101 06 958 | 8/2001 |
| DE | 101 03 223 | 11/2001 |
| EP | 0 665 402 | 8/1995 |
| EP | 1 209 404 | 5/2002 |
| EP | 1 209 406 | 5/2002 |
| WO | 01 29477 | 4/2001 |

* cited by examiner

*Primary Examiner* — F. Daniel Lopez
(74) *Attorney, Agent, or Firm* — Davidson, Davidson & Kappel, LLC

(57) ABSTRACT

A hydraulic system, especially for motor vehicles includes a master cylinder, a slave cylinder and a pressure medium line connected thereto. The invention provides a hydraulic system which is simple or economical to produce by virtue of the fact that the hydraulic system includes at least one hydraulic plug-type connection with a plug connector and a socket contact and the plug connector includes an abutment and a sealing element which are made of different materials and which are connected together in a material fit.

8 Claims, 12 Drawing Sheets

HYDRAULIC SYSTEM

The present invention is directed to a hydraulic system, in particular for motor vehicles, including a master cylinder, a slave cylinder, a damping device, and a pressure-medium line which connects them.

BACKGROUND

A hydraulic system of this type is known, for example, from German Patent Application DE 101 06 958 A1. Hydraulic systems of this kind are used in motor vehicles, in particular, as devices for actuating brakes, as steering aids, and as devices for actuating friction clutches, for example in the power flow between an internal combustion engine and a transmission, or between an electrical machine and a drive train.

SUMMARY OF THE INVENTION

An inherent disadvantage of related-art hydraulic systems is the substantial outlay required for manufacturing.

It is an object of the present invention to provide a hydraulic system that is simpler and more cost-effective to manufacture.

The present invention provides for the hydraulic system to have at least one hydraulic plug-in connection having a plug connector, as well as a plug socket, and for the plug connector to have an abutment and a sealing element, which are made of different materials and are integrally joined to one another. In this case, the abutment is understood to be a part of the plug connector which may be introduced at least partially into a corresponding plug socket. In this context, the abutment itself does not have any sealing function, but rather, because of a substantially positive (i.e., form-locking) connection with the plug socket, is used for transmitting mechanical forces, for example buckling forces or the like, between the plug connector and the plug socket. The actual sealing function is assumed by the sealing element. The abutment and the sealing element are fabricated from different materials, the different materials being integrally joined to one another. The plug connector is preferably manufactured from a plastic in an injection molding process, the abutment and the sealing element made of different materials being manufactured in one or two successive operations. This may be accomplished in one and the same injection mold or in different injection molds.

In addition to the integral connection between the abutment and the sealing element, a form-locking connection between the abutment and sealing element may be provided. The form-locking connection may be produced, for example, by a partial penetration of the different materials in the form of bulges and pockets or by a groove and tongue-type arrangement.

The abutment is preferably fabricated from an injection-moldable plastic, for example an elastomer. The sealing element is preferably fabricated from a thermoplastic elastomer, a liquid silicon rubber, a general purpose elastomer, or a combination of these materials. With respect to their elasticity and surface condition, plastics of this kind exhibit optimal material properties for producing an impervious connection.

An external bead is preferably integrally molded on the sealing element. In this context, the bead is dimensioned in such a way that its outer periphery is larger than the inner periphery of the part of the plug socket corresponding thereto. In this manner, the outer bead of the sealing element exerts a surface pressure on parts of the inner surface of the connector element when connection is made with the connector element, thereby producing a sealing connection.

In the same way, an inner bead may be integrally molded on the sealing element. Its purpose is to sealingly connect the plug connector to a hydraulic line fitted into the same. To that end, the inner diameter of the inner bead is smaller than the outer diameter of the hydraulic line. Both the inner as well as the outer bead are disposed substantially rotationally symmetrically over the entire periphery of the sealing element.

A further refinement of the hydraulic system provides for the plug connector to include an annular groove into which a clamping spring may engage, a non-positive and/or positive connection being able to be produced between the plug connector and a plug socket via the clamping spring. The clamping spring is typically fastened to the plug socket, for example in a groove or in one or more bores. The connection between the plug connector and the plug socket is established simply by pressing the plug connector into the plug socket. The connection may be released, for example, by pulling the clamping spring out of the socket. Alternatively, a non-circumferential groove may be provided in place of an annular groove in the plug connector, so that, by axially twisting the plug connector, the clamping spring is pressed to the outside, thereby enabling the connection between the plug connector and the plug socket to be released.

In addition, it may be provided for the abutment and the sealing element to be fabricated from differently dyed materials. This measure makes it possible to identify different plug connector designs, for example different plug connector diameters, different test pressures, or different sealing formations.

The present invention also provides a hydraulic system that includes at least one hydraulic plug-in connection having a plug connector and a plug socket, the plug-in connection includes an arrangement of a clamping spring and at least one groove for providing the non-positive and/or positive connection between the plug connector and the plug socket, and the clamping spring is wavy and/or bent. Therefore, when viewed from the side, the clamping spring is not flat, but rather bent in an angular, semicircular or wave shape. As a result of this refinement, given a manufactured plug-in connection, the clamping spring rests in the installed position between the plug connector and the plug socket in the groove in such a way that the plug connector is axially fixed without play.

The groove is preferably an annular groove. The groove may alternatively be made up of individual grooves which are placed, for example, on opposite sides of the plug connector. An annular groove is simpler to manufacture than individually placed grooves.

The height of the annular groove is preferably greater than the height of the clamping spring, so that the clamping spring rests under axial tension in the groove. This means that if the clamping spring were flat and not bent in accordance with the present invention, it would be fixed in the groove with perceptible play. Because of its wavy or bent form, the clamping spring rests in the installed position under axial tension in the groove. The clamping spring thereby effects an axial, free-from-play connection between the plug connector and the plug socket.

An alternative embodiment of the hydraulic system according to the present invention provides for the hydraulic system to include at least one hydraulic plug-in connection having a plug connector and a plug socket, the plug-in connection including an arrangement of a clamping spring and at least one groove for providing the non-positive and/or positive connection between the plug connector and the plug socket, and a spring element being positioned between an end face of the plug connector and a base area of the plug socket. The spring element presses apart the plug connector and the plug socket in the axial direction against the motion of the clamping spring. This enables a connection to be established that is substantially free from play between the plug socket and the plug connector.

The spring element is preferably a corrugated washer. A corrugated washer is especially simple to manufacture and particularly easy to handle when producing the connection between the plug connector and the plug socket.

The two initially alternative specific embodiments of the hydraulic plug-in connection may also be combined by designing the clamping spring and the groove, as well as the spring element in accordance with the present invention.

The present invention also provides a hydraulic system which includes a damping device, the damping device having a hose barb for connection to the pressure-medium line. The hose barb makes it possible to connect the damping device directly to the pressure-medium line. In addition, this measure reduces the space required for the damping device. The barb is located on the damping device in place of one of the connectors.

The hose barb is preferably integrally formed in one piece with the damping device. For example, the hose barb may be integrally formed in one piece with a housing element of the damping device. This measure makes it possible for the hose barb to be manufactured with the housing element, for example, in one operation. In this case, for example, a welded connection is suitable as a one-piece connection. Alternatively, the hose barb may be integrally cast in one piece with a housing part of the damping device.

In one alternative embodiment of the present invention, the hose barb is detachably secured to the damping device. For example, the hose barb may be bolted to the damping device or have a bayonet fitting type of connection.

The present invention also provides a hydraulic system having a damping device which includes a switchable orifice. Switchable orifice is understood here to mean that the orifice is only effective in one direction of flow. In this manner, the function of an orifice, which is only effective in one direction and acts as an independent component part, and the function of the damping device are combined in one component. As a result, it is not only possible to reduce the outlay for assembly, but for manufacturing costs as well, as compared to an assemblage of two individual components.

In one preferred embodiment, the damping device includes both a first as well as a second valve. Another embodiment of the present invention provides for the first valve to open in response to the damping device being traversed by flow from the master cylinder side to the slave cylinder side, and for the second valve to open in response to the damping device being traversed by flow from the slave cylinder side to the master cylinder side. In this context, the switchable orifice is preferably positioned in such a way that it is traversed by flow when the damping device is traversed by flow from the slave cylinder side to the master cylinder side. The switchable orifice is preferably situated behind the second valve when the damping device is traversed by flow from the slave cylinder side to the master cylinder side.

One preferred embodiment of the hydraulic system according to the present invention provides for the valves to be constituted of passage openings and of at least one hose sleeve, the hose sleeve being able to seal the passage openings in one direction of flow in each case and open them in the other direction of flow. Such an embodiment of the valves renders possible an especially reliable blocking effect and, respectively, hydraulic conductivity in the context of an especially simple assembly and manufacture of individual parts.

The damping device preferably includes both a first as well as a second housing part, the second housing part having a valve section including a first channel and a second channel. In this manner, the essential functional elements of the damping device are integrated in the second housing part, so that only the second housing part is expensive to manufacture, and the first housing part is a comparatively simple housing component.

In one embodiment of the damping device, the hose sleeve includes a sealing bead for sealing off the first housing part from the second housing part. This measure eliminates the need for other sealing means, such as a special seal, between the housing parts, thereby simplifying the assembly of the damping device.

Furthermore, the present invention provides a hydraulic system in which a pressure-line connection is provided having means for venting the hydraulic actuating system, and in which the pressure-line connection has an axially rotatable sleeve having a first vent bore, which, together with at least one second vent bore, forms a sealable valve. The hydraulic actuating system is able to be vented by way of the sealable valve. In general, there is no need for any further valves in the hydraulic actuating system. In addition, the valve mounted directly on the pressure-line connection is easily accessible in the installed state.

Another embodiment provides for a second vent bore to be introduced into a hollow tubular connecting member and for a hose gasket having a third vent bore to be situated on the tubular connecting member, the second and third vent bore being positioned more or less axially with respect to one another, and a rotatable sleeve having a first vent bore being situated on the hose gasket, the first vent bore being disposed in a first position of the rotatable sleeve more or less axially with respect to the second vent bore and, in a second position, outside of an overlap region of the second vent bore. Both the hose gasket as well as the sleeve formed as a plastic ring are commercial components. The vent may be opened or closed by a 180° rotation of the sleeve about the longitudinal axis, which is ensured by an anti-rotation element having a limit stop. Potential leakage is prevented by placing a bead around the vent bore on the adapter plug connector. Any twisting of the hose gasket is prevented by the placement of the tubular connecting member and groove in the respective parts. Any possible twisting and/or slipping of the plastic ring is prevented by providing a latching function on the adapter plug connector and simultaneous clamp locking using wire form springs.

The sleeve is preferably transferred by axial rotation from the first position into the second position. Instead of an axial rotation, an axial displacement of the sleeve would also be possible in this case.

The sleeve is preferably fixed to the tubular connecting member in the axial direction by a stop spring. In spite of an axially fixed arrangement, a connection of this kind still permits a rotation about the axial axis.

The sleeve preferably locks into place in the closed rotational position. Here, 'locking into place' is understood to mean that an initial resistance must first be overcome in order to rotate the sleeve. This measure prevents the vent valve from being unintentionally opened and, at the same time, it indicates, by the locking function, when the closed position has been reached. In addition, this measure prevents an unintentional opening during operation, for example due to vibrations or the like.

The present invention furthermore provides a hydraulic system in which provision is made for a pressure-line connection and for at least parts of the pressure-line connection to be produced using a gas- or fluid-injection method. This measure also makes it possible for bent or rounded molded parts to be produced.

Another embodiment of the pressure-line connection according to the present invention includes at least one plug connector and/or one socket whose hollow space is produced using a mold core. This makes it possible to improve the molding accuracy and the surface condition of the plug connectors and, respectively, of the plug sockets.

BRIEF DESCRIPTION OF THE DRAWINGS

Exemplary embodiments of the present invention are described in greater detail below with reference to the accompanying drawings. Specifically, the figures show.

DETAILED DESCRIPTION

Figure 1:
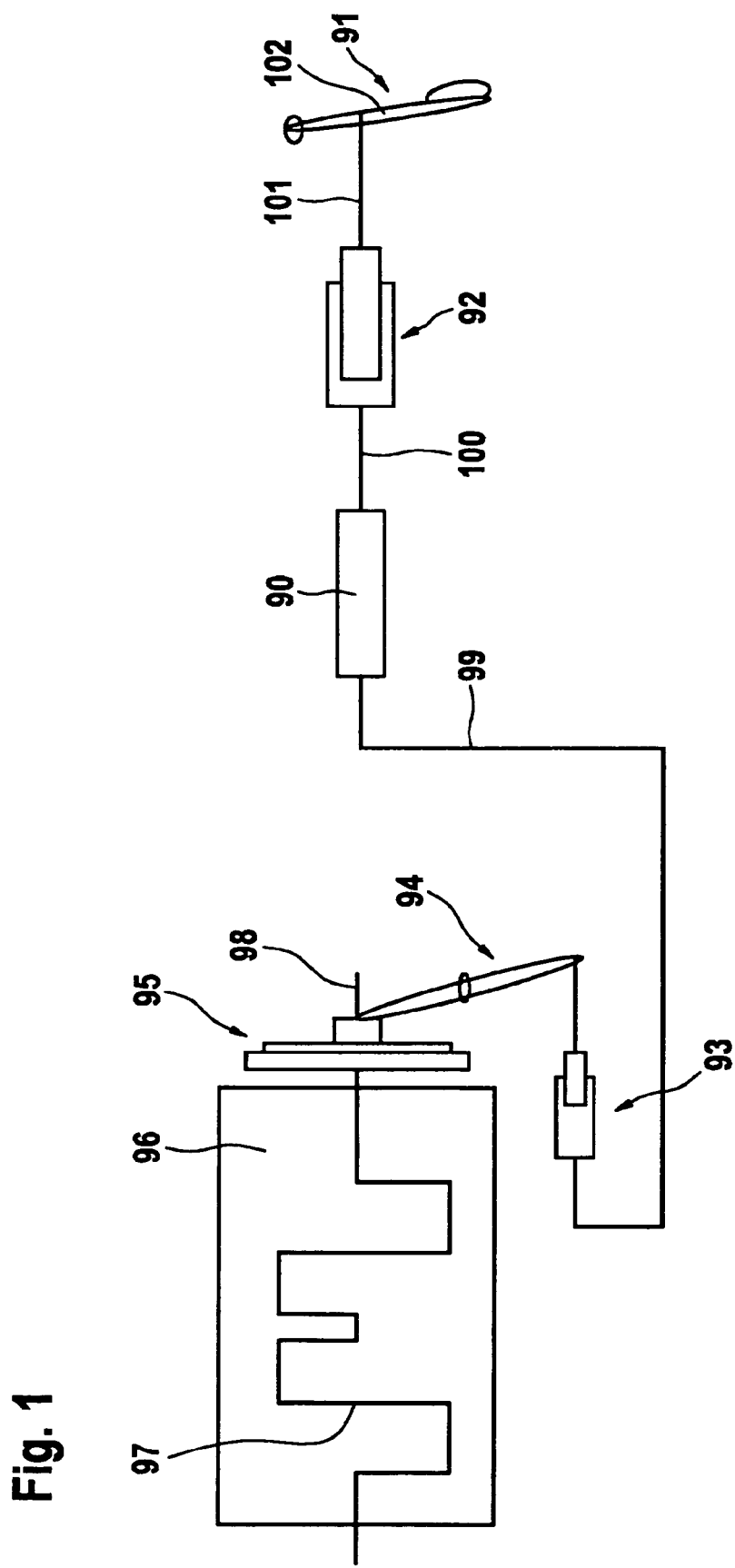
FIG. 1: a schematic representation of a hydraulic system on the basis of an exemplary embodiment of a clutch release device.

FIG. 1 schematically shows one possible embodiment of a hydraulic system having a pressure-limiting valve 90, considering as an example a clutch release device 91 having a master cylinder 92 and a slave cylinder 93. In the exemplary embodiment shown, pressure-limiting valve 90 is installed in line sections 99 and 100 and separates them from one another in the unopened state. It is understood that in other exemplary embodiments, pressure-limiting valve 90 may be integrated in master cylinder 92 or in slave cylinder 93, and in other hydraulic systems, such as brake systems, power steering systems, and the like, it may be integrated in a functional component. In addition, a pressure-limiting valve according to the present invention may be advantageously used in any hydraulic line system as a pressure-limiting valve and/or as an oscillation filter, for example as a so-called "pulsation filter".

Clutch release system 91 hydraulically operates clutch 95 by acting upon master cylinder 92 via an actuating member 102, which may be a foot pedal, an actuator, such as an electrical actuator, or the like. In this manner, a mechanical transmission means 101 builds up pressure in master cylinder 92, which, via line section 100, pressure-limiting valve 90, and line section 99, builds up pressure in slave cylinder 93. As shown in this example, slave cylinder 93 may be arranged concentrically around transmission input shaft 98 and be axially supported on a transmission housing (not shown), and, via a release bearing, may impart the necessary release force to clutch 95, respectively, to its release elements, such as the disk springs. Further embodiments may provide for a slave cylinder 93, which actuates a disengagement element via a disengagement mechanism, and which is located outside of the clutch bell; the slave cylinder axially loading the disengagement mechanism via a piston which is in hydraulic communication with the master cylinder and accommodated in the slave cylinder housing. To apply the release force, the slave cylinder is immovably secured to the transmission housing (not specifically shown here), or to another component that is immovably fixed to the housing. When clutch 95 is closed, transmission input shaft 98 transmits the torque of internal combustion engine 96 to a transmission (not specifically shown), and then to the drive wheels of a motor vehicle.

Crankshaft 97 is subjected to irregular loading as a result of the combustion processes in internal combustion engine 25 and as a function of the design of internal combustion engine 96, depending, for example, on the number of cylinders. The irregular loads are manifested in the crankshaft as axial and/or wobbling vibrations and are transmitted through disengagement mechanism 94 to slave cylinder 93, through line system 99, 100, to master cylinder 92, and, from there, via mechanical connection 101 to actuating member 102. If the actuating member is a clutch pedal, these vibrations are perceived as an annoyance. In the case that actuating member 102 is an actuator, such vibrations can result, for example, in reduced control accuracy, or in a shortened service life. Pressure-limiting valve 90 is therefore inserted in lines 99, 100 for damping purposes, and tuned to damp the vibrations introduced by crankshaft 97. Such vibrations typically fall in the frequency range of 50 to 200 Hz.

Figure 2:
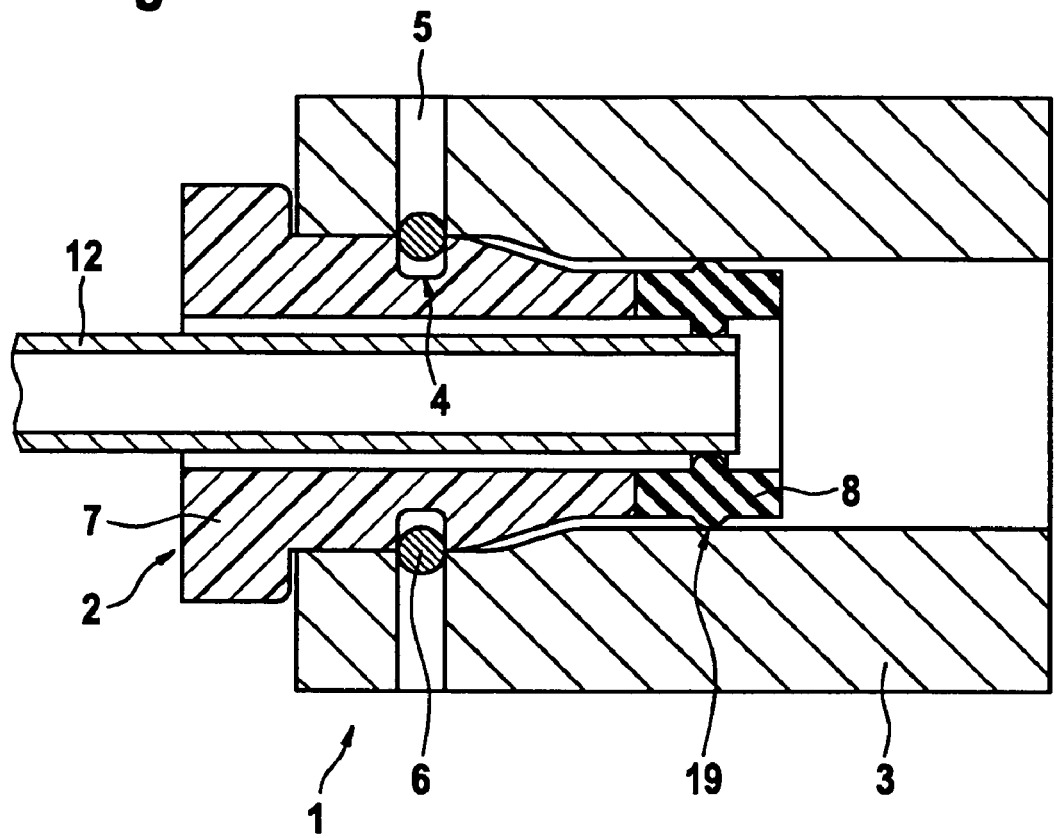
FIG. 2: a diagrammatic sketch of a hydraulic plug-in connection in longitudinal section.

FIG. 2 shows a longitudinal section through a hydraulic plug-in connection 1, which includes a plug connector 2, as well as a plug socket 3. In this context, the purpose of FIG. 2 is first to clarify the use and interaction of the plug connector and plug socket. Both plug connector 2, as well as plug socket 3 are connected to pressure-medium lines 99, 100 (not shown in FIG. 2), in accordance with FIG. 1. Plug connector 2 has a circumferential annular groove 4, into which a clamping spring 6 introduced into a recess 5 engages in the installed state.

Figure 3:
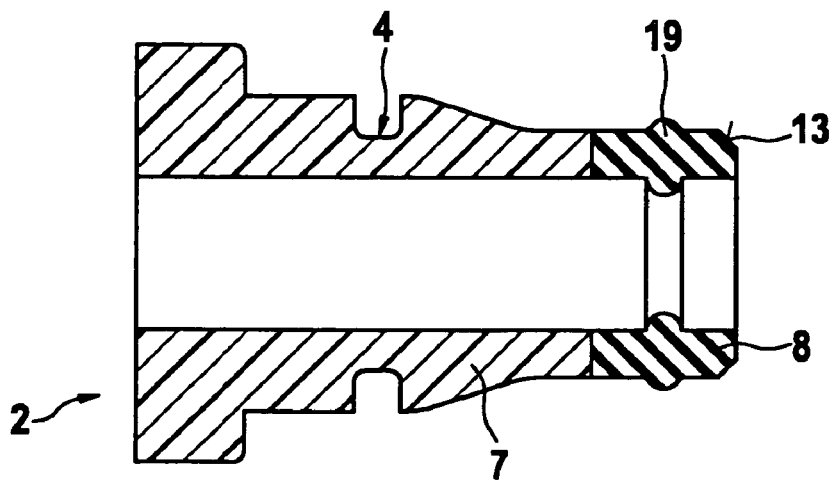
FIG. 3: a longitudinal section through a first specific embodiment of a plug connector according to the present invention.

FIG. 3 shows a longitudinal section of a first specific embodiment of a plug connector 2 according to the present invention. It is composed of an abutment 7, as well as of a sealing element 8 positioned on the end face of abutment 7. Both abutment 7, as well as sealing element 8 are made of a plastic, however each of a different plastic. Depending on the desired field of application, abutment 7 may be made of any desired plastic of sufficient strength, preferably of a thermoplastic plastic, so that the component may be manufactured by injection molding or similar methods. The sealing element is preferably made of a thermoplastic elastomer (TPE), liquid silicon rubber (LSR), or of any other elastomer.

Plug connector 2 is preferably manufactured in an injection molding process, abutment 7 and sealing element 8 made of a different material being manufactured in one or two successive operations. This may be accomplished in one and the same injection mold or in different injection molds. Thus, two different plastics are introduced into the injection mold simultaneously or successively, the different plastics being introduced in such a way that abutment 7 is fabricated from one plastic, sealing element 8 from the other plastic. Abutment 7 and sealing element 8 are integrally joined to one another at their point of contact.

Figure 4:
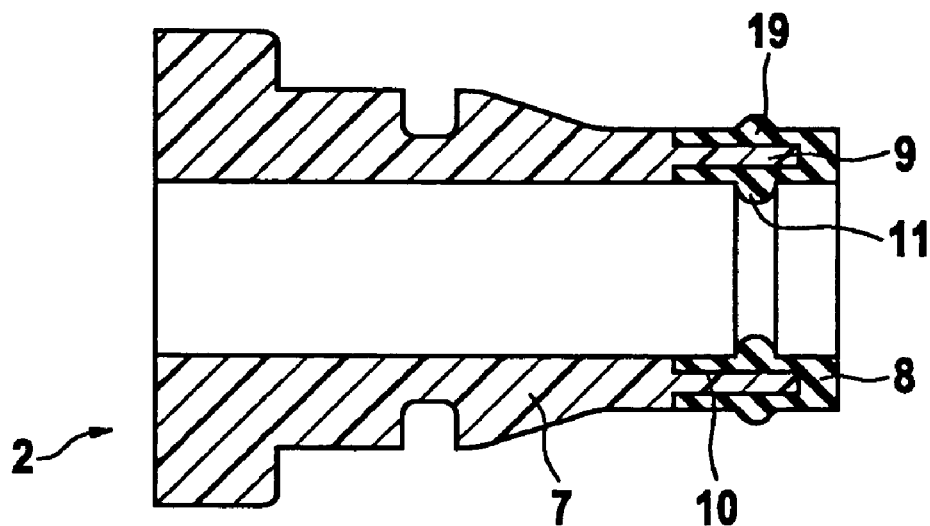
FIG. 4: a longitudinal section through a second specific embodiment of a plug connector according to the present invention.

FIG. 4 depicts another specific embodiment of a plug connector 2 according to the present invention, in which the connection between abutment 7 and sealing element 8 is designed to be integral as well form-locking. To that end, integrally molded on the end face of abutment 7 is an annular extension 9, upon which is placed a sealing element 8 having a recess 10 corresponding thereto. In this case, sealing element 8, as well as abutment 7 may be fabricated as separate plastic parts and first be joined together afterwards, for example via a bonded adhesive connection or latching-type snap-on connections. In the same way, in accordance with the specific embodiment of FIG. 4 and similarly to that of FIG. 3, plug connector 2 may be fabricated from different plastics in one or more operations. For example, abutment 7 may initially be fabricated in one injection mold and, in another injection mold, its end face may be provided with sealing element 8 made of another plastic.

Sealing element 8 is provided with an outer circumferential bead 19 which seals off plug connector 2 from plug socket 3. In addition, an inner bead 11 may be situated on the inside of sealing element 8. Its purpose is to seal off plug connector 2 from a hydraulic tubing 12 of a pressure-medium line 99 and, respectively, 100 in accordance with FIG. 1, which is inserted into plug connector 2. To facilitate assembly, a chamfer 13, as shown in FIG. 3, may be configured on the end face of sealing element 8 facing plug socket 3.

Figure 5:
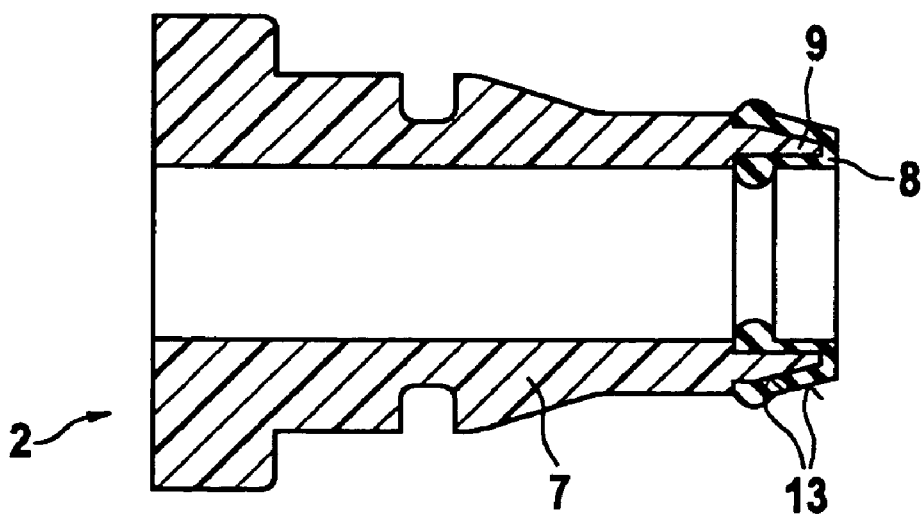
FIG. 5: a longitudinal section through a third specific embodiment of a plug connector according to the present invention.

FIG. 5 shows a modified embodiment of the plug-in connection in accordance with FIG. 4. Here, both annular extension 9, as well as corresponding sealing element 8 are provided with a circumferential chamfer 13 to facilitate assembly.

The color of the plastic of sealing element 8 may differ from that of the plastic of abutment 7. The different colors may be used, for example, as a basis for identifying plug connector 2.

The abutment is preferably manufactured in an injection molding process, in which abutment 7 has different physical and chemical properties than sealing element 8. To that end, in the present exemplary embodiment, different plastics are selected for abutment 7 and for sealing element 8.

Figure 6:
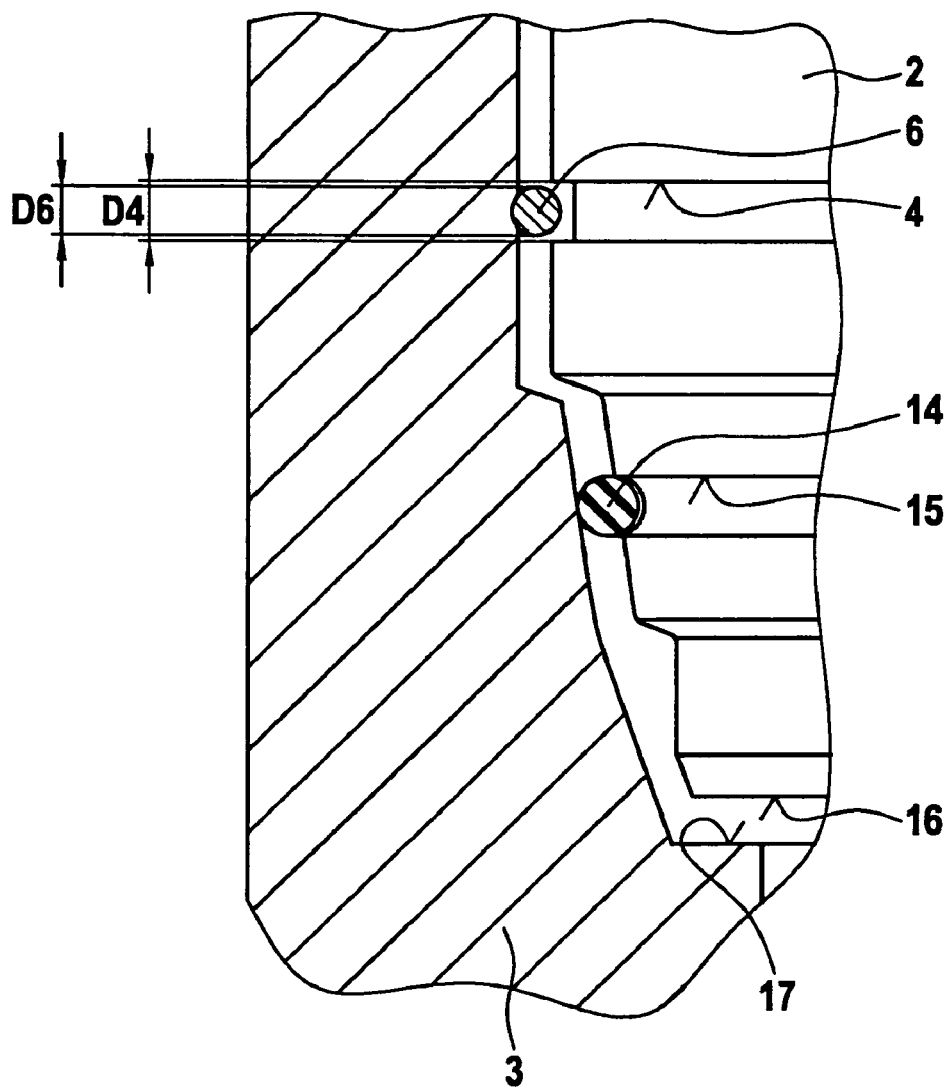
FIG. 6: a part sectional view of a first fastening arrangement of a hydraulic plug-in connection.
Figure 7:
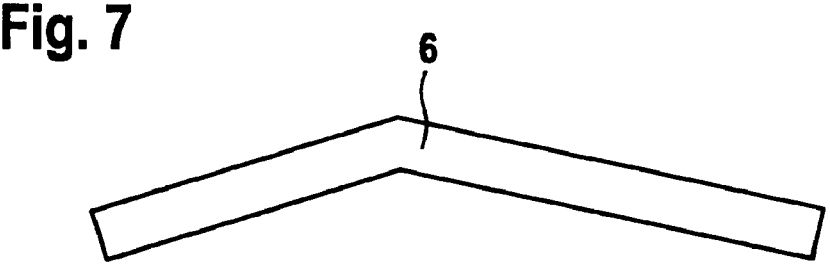
FIG. 7: a clamping spring for use in an arrangement in accordance with FIG. 6.

FIG. 6 shows a diagrammatic sketch of a hydraulic plug-in connection in a part sectional view. The fastening arrangement corresponds along general lines to the representation of FIG. 2. Therefore, identical components have the same designations. A plug connector 2 is detachably connected to a plug socket 3. To that end, a clamping spring 6 engages in an annular groove 4 of plug connector 2. Alternatively, the annular groove may be designed as a groove-like notch or in the form of two mutually opposing, individual grooves. Clamping spring 6 may be placed via a recess 5 in plug socket 3, along the lines of the representation of FIG. 2, or be placed in plug socket 3 via a through hole (not shown in greater detail). Plug connector 2 is inserted axially into plug socket 3 during manufacture of the hydraulic plug-in connection. Due to the substantially conical outer form of plug connector 2, clamping spring 6 is pressed to the outside and is able to snap into annular groove 4, as soon as plug connector 2 is introduced far enough into plug socket 3. A positive and/or non-positive connection of plug connector 2 with plug socket 3 is formed in this manner. An O-ring 14 is positioned in an O-ring groove 15 of plug connector 2 and, in the installed state depicted in FIG. 6, rests against the inner wall of plug socket 3, in which the plug-in connection is sealingly established. Height D4 of annular groove 4 is greater than height D6 of clamping spring 6. Clamping spring 6 shown in a side view in FIG. 7 is angled.

Figure 8:
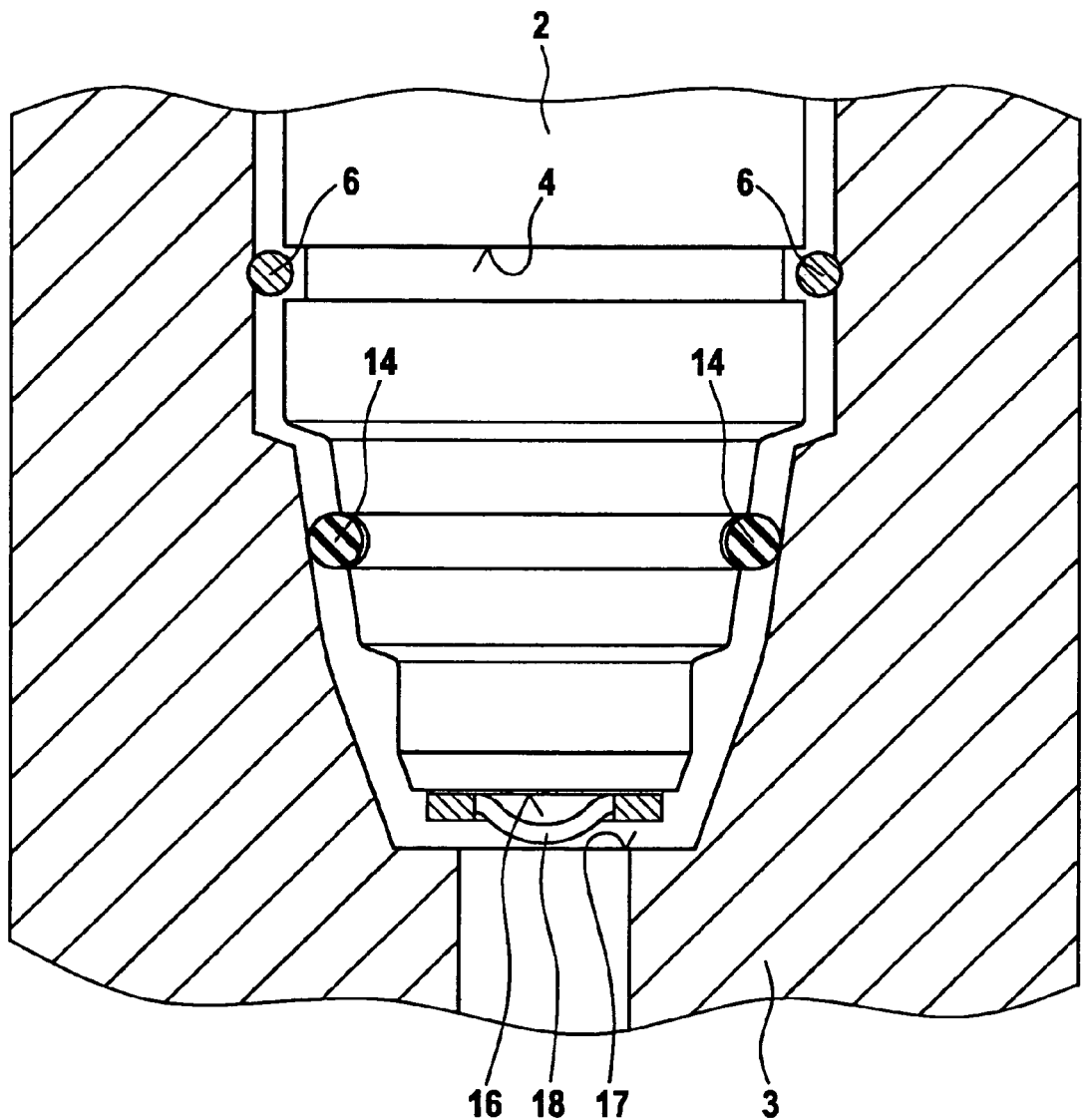
FIG. 8: a second fastening arrangement of a hydraulic plug-in connection.

FIG. 8 shows an alternative embodiment of the plug-in connection according to the present invention. Here, an ondular washer 18 is positioned between an end face 16 of plug connector 2 and a base area 17 of plug socket 3. In this context, FIG. 8 shows the sealingly produced hydraulic plug-in connection 1 between plug connector 2 and plug socket 3. When producing the connection, plug connector 2 is to be pressed against a spring force produced by ondular washer 18 into plug socket 3 to the point where clamping spring 6 snaps into place in annular groove 4.

Figure 9:
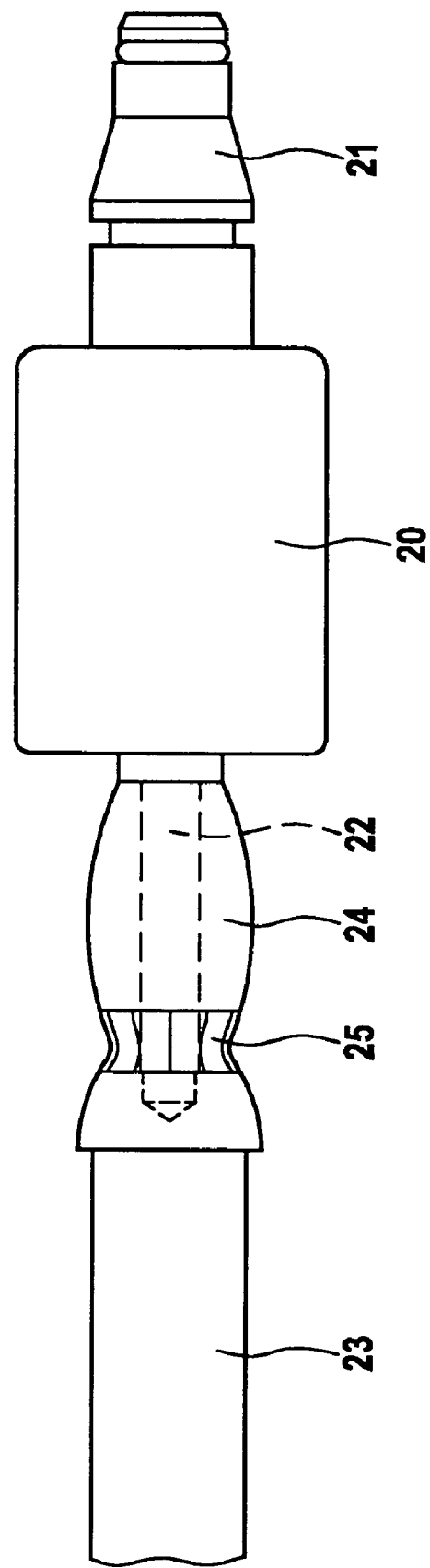
FIG. 9: a damping device in accordance with the present invention in a part sectional view.

FIG. 9 shows a damping device 20, a so-called pulsation filter, which may be placed in hydraulic systems for damping unwanted pressure fluctuations in a hydraulic line. Damping device 20 is provided with a plug-in connection 21 for connection to a clutch (not shown), for example to a central release mechanism of a motor vehicle clutch. The function of the generally known damping device 20 will not be discussed in greater detail here. A hose barb connection 22 is flange-mounted on the side of damping device 20 opposing plug-in connection 21. A hose 23 may be secured with the aid of hose fitting 24 to hose barb 22. Hose fitting 24 is provided in a generally known manner with a press-fit location 25, making it possible for a frictionally locked connection to be established between hose barb 22 and hose 23. Hose barb 22 is integrally formed in one piece with damping device 20, for example by forming a welded connection, or by manufacturing the housing of the damping device and hose barb 22 in one piece, for example by casting, lathing, forging, or the like. Alternatively, hose barb 22 may be detachably connected to damping device 20, for example by a screw connection.

Figure 10:
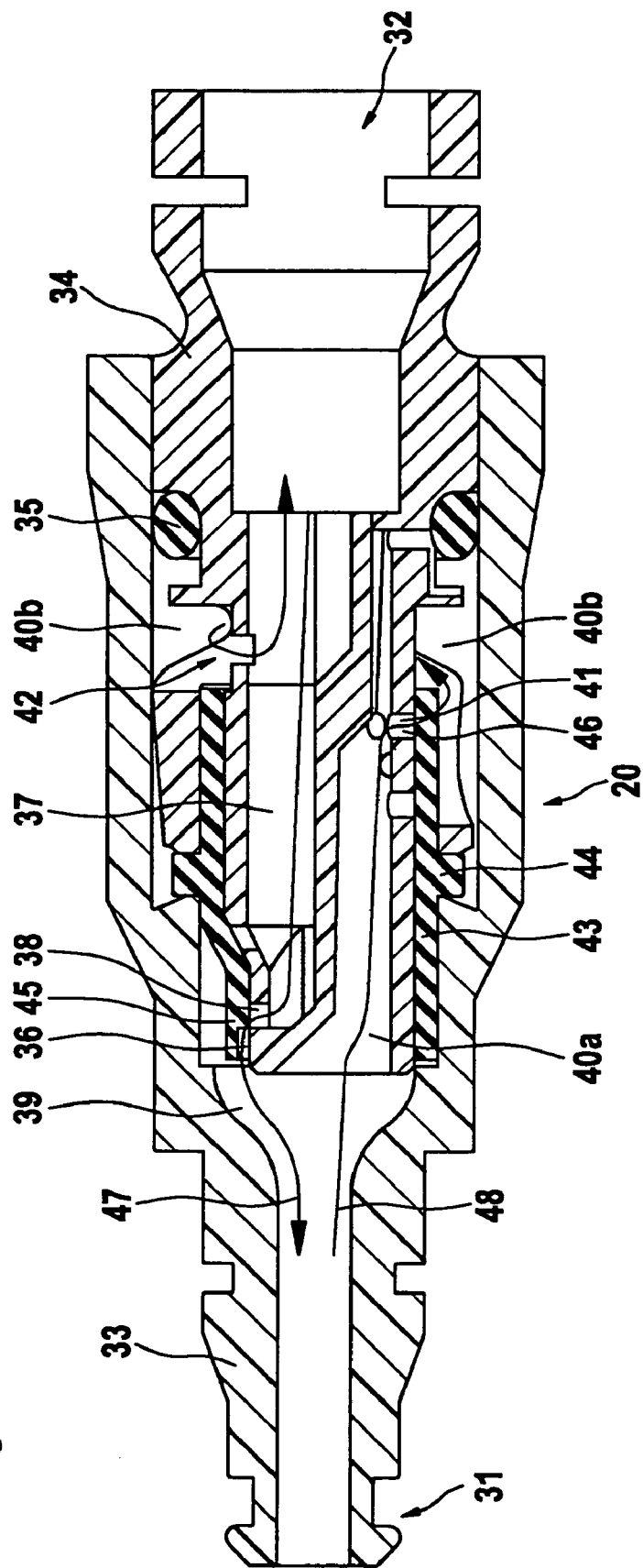
FIG. 10: a damping device having an integrated, switchable orifice.

FIG. 10 shows a damping device 20, also referred to as a pulsation filter, which may also be inserted as an additional component into a pressure-medium line 99, 100 (not shown in greater detail). To that end, it is provided with a plug connector 31, as well as with a plug socket 32. Plug connector 31 may be designed both in accordance with the related art as well as in accordance with one of the embodiments previously described with reference to FIGS. 2 through 7. Plug socket 32 may be designed in accordance with plug socket 3 previously clarified with reference to FIGS. 2 through 7 or, however, be replaced by a hose barb 22 in accordance with the embodiment described with reference to FIG. 9. Plug connector 31 is connected to a slave cylinder 93 (not shown here). Correspondingly, plug socket 32 is connected to a master cylinder 92 (not shown here).

Damping device 20 includes a first housing part 33, as well as a second housing part 34. The two housing parts 33, 34 are sealed off from one another in a pressure-tight manner by a gasket ring 35. The second housing part 34 includes a valve section 36 situated within first housing part 33. This valve section 36 includes a first channel 37 which leads via a first passage opening 38 into an annular space 39 between first housing part 33 and second housing part 34. A second channel 40 is composed of a first region 40a, as well as of a second region 40b. Second region 40b extends substantially radially in the circumferential direction between first and second housing part 33, 34 and forms an annular space there. First and second regions 40a, 40b are joined to one another by a second passage opening 41. An orifice 42 establishes a connection between the second region of second channel 40b and first channel 37. Valve section 36 is surrounded by a hose sleeve 43, which, with first passage opening 38 and second passage opening 41, in each case forms a valve that is permeable in only one direction. Hose sleeve 43 includes a circumferential sealing bead 44 which seals off the second region of second channel 40b from annular space 39.

Together with hose sleeve 43, first passage opening 38 forms a first valve 45. Correspondingly, together with hose sleeve 43, second passage opening 41 forms a second valve 46.

When damping device 20 is traversed by flow from the master cylinder side to the slave cylinder side, as illustrated in FIG. 10 by an arrow 47, this takes place in the direction of flow of first valve 45. In this case, a flow is possible through first channel 37 and through first valve 45 into annular space 39. In the opposite direction, as indicated by an arrow 48 in FIG. 10, the direction of flow is from slave cylinder 93 to master cylinder 92 via annular space 39, the first region of second channel 40a and second valve 46 into the second region of second channel 40b. The hydraulic fluid may then continue to flow across orifice 42 into first channel 37. Thus, orifice 42 makes it possible for an additional resistance to flow that is only effective in one direction of flow to be incorporated into damping device 20.

A plurality of first passage openings 38, as well as a plurality of second passage openings 41 may also be distributed over the periphery of damping device 20, so that a plurality of valves may be formed here. As throttle channels, the passage openings are adapted in diameter and form to the throttling conditions, i.e., the damping requirements. Hose sleeve 43 is fabricated from an elastic plastic or rubber material. Hose sleeve 43 may, in sections, be reinforced or have a multilayer construction. It may be reinforced, for example, by fabric, or by rings or spirals of plastic or metal. Hose section 43 is preferably fitted onto valve section 36 under pretensioning action.

Figure 11:
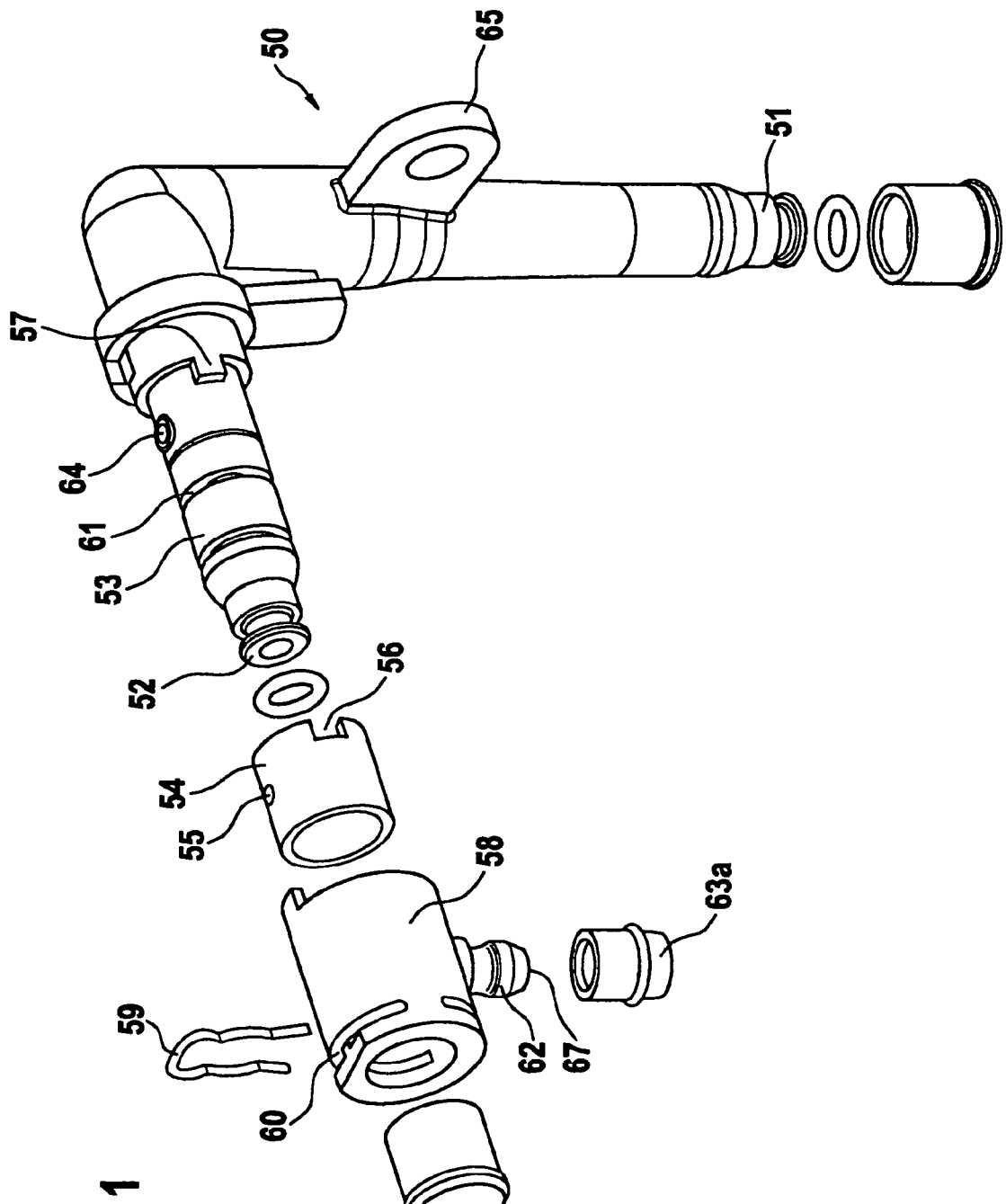
FIG. 11: an exploded view of a pressure-line connection in accordance with the present invention.
Figure 12:
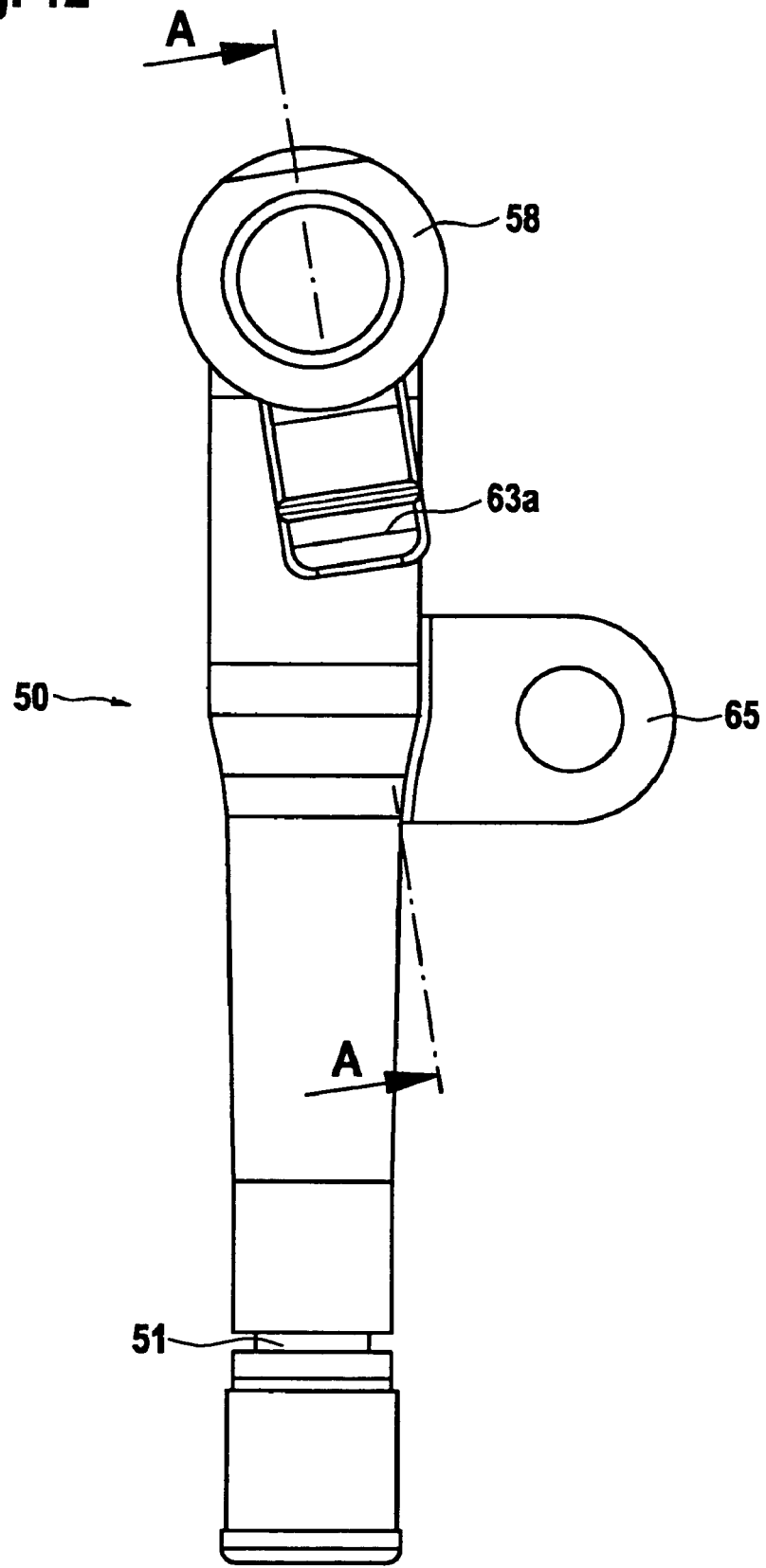
FIG. 12: a pressure connection in accordance with the present invention, in a plan view according to FIG. 11.
Figure 13:
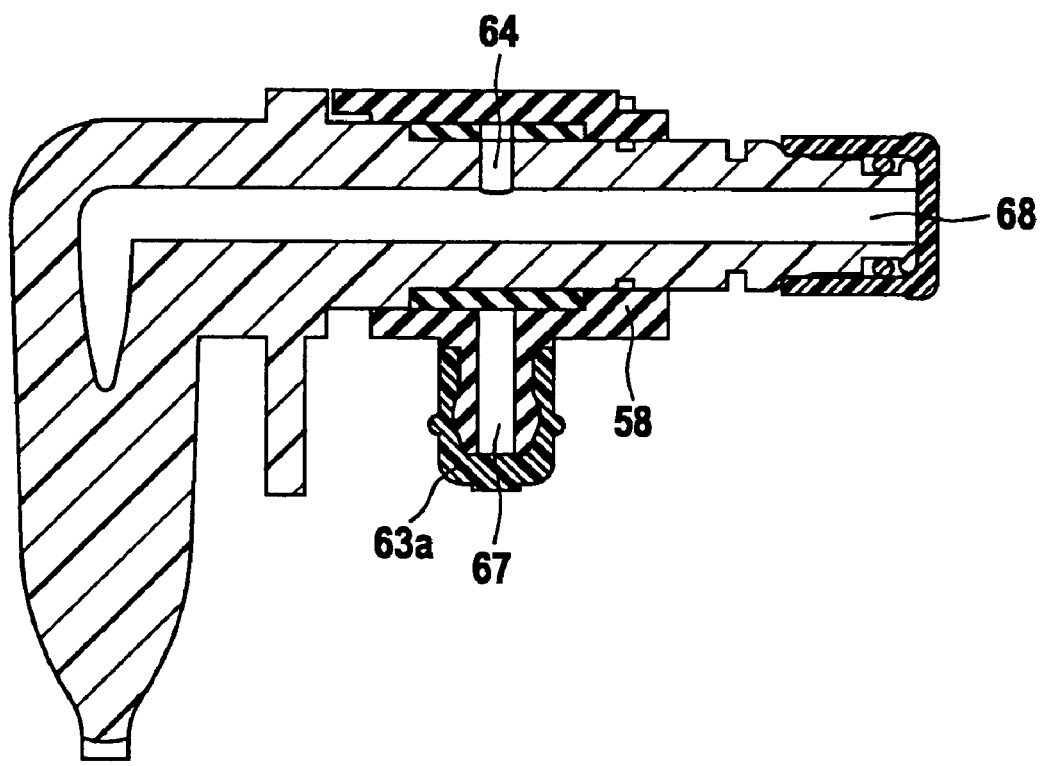
FIG. 13: a section along A-A in FIG. 12 in a first position.

FIG. 11 shows an exploded view; FIGS. 12 and 13 a plan view and side view, respectively, of a pressure-line connection 50 according to the present invention. Pressure-line connection 50 includes a first plug connector 51, as well as a second plug connector 52. Here, pressure-line connection 50 is designed to have an approximately 90° angle. However, other angles or a rectilinear design are also conceivable. Pressure connection 50 has an altogether hollow design and forms an interior space 68 through which hydraulic fluid or the like may flow. A hose seal 54 having a vent bore 55 is slid over a tubular connecting member 53. Hose seal 54 is provided with a groove-type cutout 56 which is able to engage with tongue-type projection 57 and, in the installed state, prevents hose seal 54 from rotating in relation to tubular connecting member 53. A sleeve 58, which is rotationally mounted on hose seal 54 and, respectively, on tubular connecting member 53 is slid over hose seal 54.

Sleeve 58 is axially fixed to tubular connecting member 53 by a stop spring 59, which is insertable into a recess 60 of sleeve 58 and, in the installed state, engages in an annular groove 61 of tubular connecting member 53. In spite of being axially fixed to this tubular connecting member 53, in the installed state, sleeve 58 is positioned in a way that permits radial rotation. A hose connection 62, which is provided with a closure cap 63a, is arranged on sleeve 58. Hose connection 62 includes a vent bore 67, which, in one rotational position of sleeve 58, is brought into coincidence with vent bore 55 of hose seal 54. A vent bore 64, which, in the installed state of hose seal 54, is in alignment with vent bore 55 of hose seal 54, is introduced into tubular connecting member 53.

Indentations which, in specific rotational positions, effect a latching function with sleeve 58 and thus with stop spring 59, are introduced into annular groove 61, so that, in this rotational position, an increased initial torque force must be overcome to rotate sleeve 58. In this manner, the sleeve is arrested in this position. Preferably, this position is selected in such a way that the bore of hose connection 62 is not in alignment and thus not coincident with vent bore 55.

A bracket 65, which may be used to attach pressure-line connection 50 to the clutch bell of a motor vehicle (not shown), is configured on pressure line connection 50. In the installed state of pressure-line connection 50, a web 66 is used to sealingly cover an opening introduced into the clutch bell (not shown here) for feeding through pressure-line connection 50.

Figure 14:
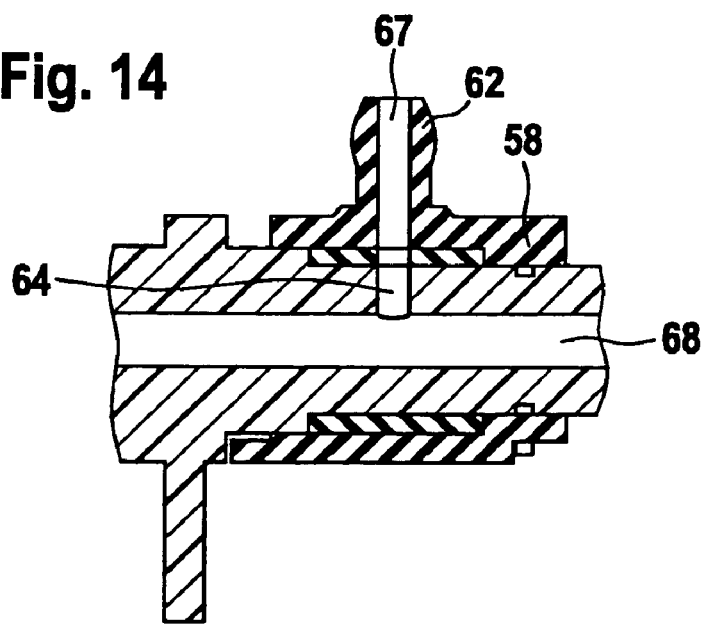
FIG. 14: a section along A-A in FIG. 12 in a second position.

The function of the pressure-line connection in accordance with the present invention is illustrated in FIGS. 13 and 14. FIG. 13 shows a section along A-A in FIG. 12. Here, a closed position of the pressure-line connection is shown. In this case, vent bore 67 of hose connection 62 is axially rotated 180° relatively to vent bore 55 of hose seal 54 and, respectively, to vent bore 64 of tubular connecting member 53. Therefore, no hydraulic fluid is able to leak from interior space 68 through vent bore 67.

A second vent bore 64 is introduced into hollow tubular connecting member 53. A hose seal 54 having a third vent bore 55 is situated on tubular connecting member 53, second vent bore 64 and third vent bore 55 being positioned more or less axially with respect to one another, and a rotatable sleeve having a first vent bore 67 being situated on hose seal 54, first vent bore 67 being disposed in a first position of rotatable sleeve 58 more or less axially with respect to second vent bore 64 and, in a second position, outside of an overlap region of second vent bore 64.

In a second representation in accordance with FIG. 14, sleeve 58 and thus also vent bore 67 of hose connection 62 are rotated 180° relatively to the representation of FIG. 13, so that the vent bore 67 is coincident with vent bores 55 of hose seal 54 and, respectively, with vent bore 64 of tubular connecting member 53 and allows gas or hydraulic fluid to escape from interior space 68. Therefore, in this rotational position of sleeve 58, a venting of the entire hydraulic system is possible.

Figure 15:
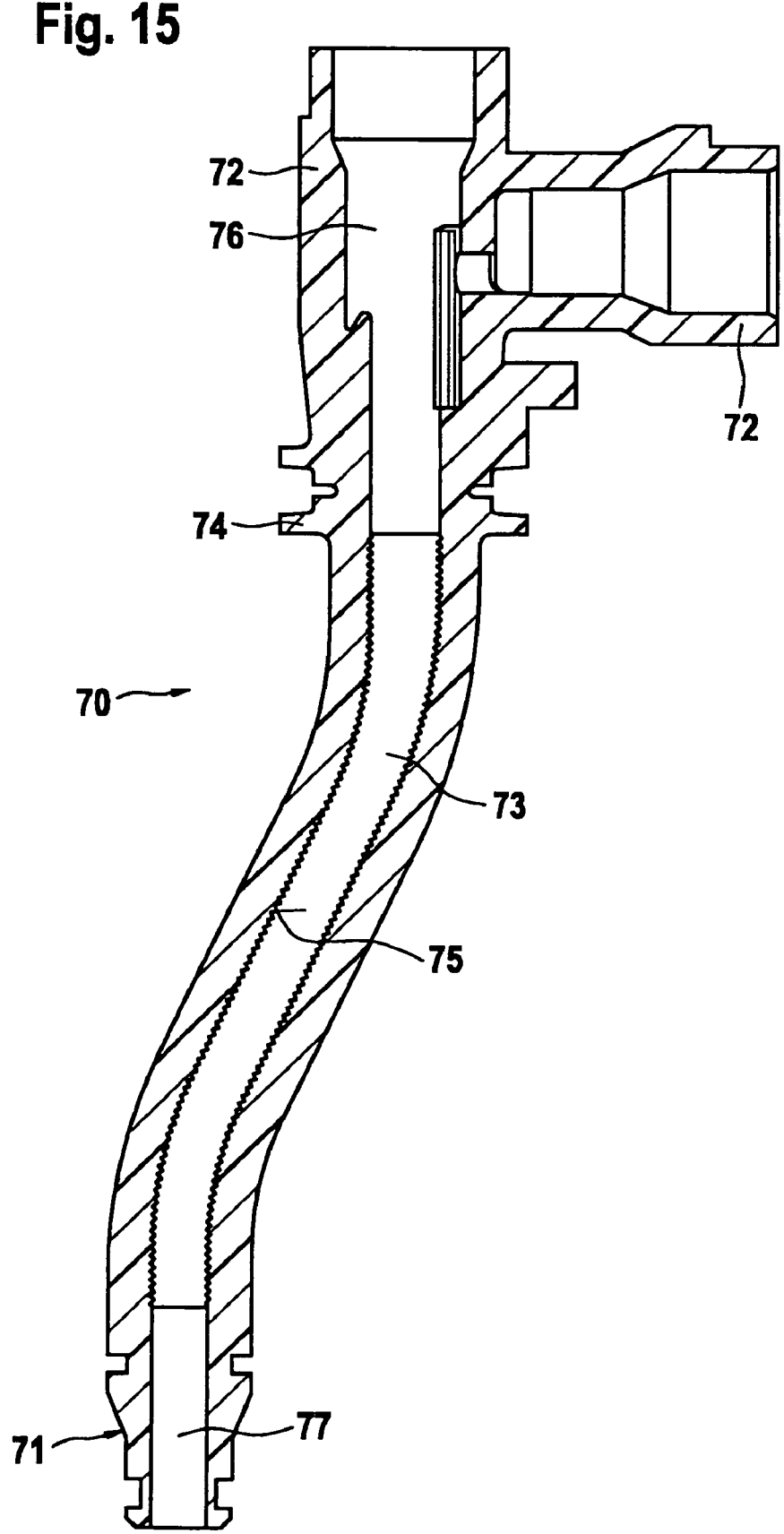
FIG. 15: a section through a first specific embodiment of a pressure-line connection according to the present invention.

FIG. 15 depicts a pressure-line connection 70 which is provided with a plug connector 71, as well as with two plug sockets 72. The pressure-line connection is used for connecting a hydraulic line (not shown in greater detail), for example, to a hydraulic central-release system of a motor vehicle. Pressure-line connection 70 is hollow over its entire length. This is characterized as hollow space 73 in FIG. 15. In the installed state, the pressure-line connection is traversed by the flow of a fluid, for example a hydraulic fluid. In the same manner as other housing parts, the pressure-line connections often contain long and thin hollow regions. Typically, components of this kind are fabricated using plastic injection molding processes. In accordance with the related art, cores are used inside the injection mold to produce hollow spaces. For long and thin hollow spaces, correspondingly long and thin cores are to be used which exhibit little mechanical stability and have the inherent risk of deformation. In addition, when working with cores of this kind, the heat dissipation is problematic. To permit demolding, the cores are designed with a straight bore axis. When cores of this kind are used, the design possibilities of the pressure-line connection are limited.

As can be directly inferred from FIG. 15, pressure-line connection 70 is a comparatively long and thin component having an elongated hollow space 73. Typically, when manufactured out of plastic, a very long and thin core is to be placed in an injection mold or the like. In the manufacturing method according to the present invention, instead of introducing a long, thin core into hollow space 73 during fabrication, the hollow space is produced directly by injecting a gas or a liquid. When the gas or fluid injection method is used, a balloon-like plastic film is molded by one or more injection molding nozzles into a negative mold of pressure-line connection 70. The balloon-like plastic film positions itself against the inside of the negative mold and fills in the bulges as exemplified by a circumferential fastening web 74 in the case of the present pressure-line connection 70. The inner surface has a substantially even, although relatively rough quality. It is designated as free surface 75 in FIG. 15. Regions in which complicated surface forms are required, such as the region of plug connector 71 or that of plug sockets 72, are produced using mold cores 76, 77. Shown here exemplarily are only one first mold core 76 for manufacturing plug sockets 72, as well as one second mold core 77 for manufacturing plug connector 71.

Figure 16:
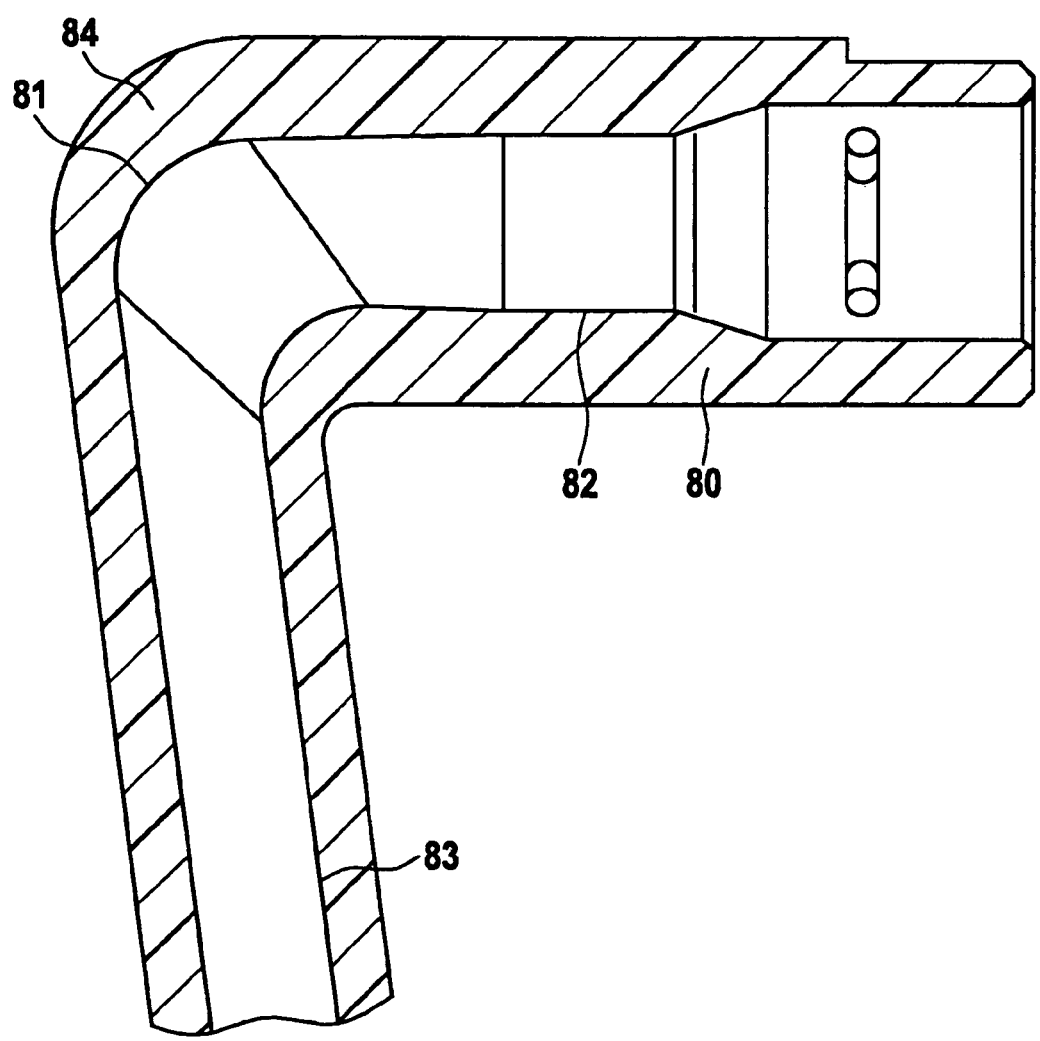
FIG. 16: a part sectional view of a second specific embodiment of a pressure-line connection according to the present invention.

By using the manufacturing method described in principle with reference to FIG. 15, it is also possible to produce more complicated hollow spaces as one-piece injection-molded components. For example, FIG. 16 shows a distinctly curved pressure-line connection 80, which has a curvature 81 of greater than 90°. In this context, a first substantially straight region 82 and a second substantially straight region 83 are joined by curvature 81. For that purpose, existing manufacturing methods required that a hole remain in the extension of section region 83, in the area of an outer curvature 84, in order to introduce a mold core. This hole was then closed by a plug, which was welded or bonded, for example. By using the manufacturing method described here, the need is eliminated for introducing a plug of this kind as an additional operation.

The claims filed with the application are proposed formulations and do not prejudice the attainment of further patent protection. The applicant reserves the right to claim still other combinations of features that, so far, have only been disclosed in the specification and/or the drawings.

The antecedents used in the dependent claims refer, by the features of the respective dependent claim, to a further embodiment of the subject matter of the main claim; they are not to be understood as renouncing attainment of an independent protection of subject matter for the combinations of features of the dependent claims having the main claim as antecedent reference.

Since, in view of the related art on the priority date, the subject matters of the dependent claims may form separate and independent inventions, the applicant reserves the right to make them the subject matter of independent claims or of divisional applications. In addition, they may also include independent inventions, whose creation is independent of the subject matters of the preceding dependent claims.

The exemplary embodiments are not to be understood as limiting the scope of the invention. Rather, within the framework of the present disclosure, numerous revisions and modifications are possible, in particular such variants, elements and combinations and/or materials, which, for example, by combining or altering individual features or elements or method steps described in connection with the general description and specific embodiments, as well as the claims, and contained in the drawings, may be inferred by one skilled in the art with regard to achieving the objective, and lead, through combinable features, to a new subject matter or to new method steps or sequences of method steps, also to the extent that they relate to manufacturing, testing, and operating methods.

What is claimed is:

1. A hydraulic system comprising:
    a master cylinder;
    a slave cylinder;
    a pressure-medium line connecting the master cylinder to the slave cylinder; and
    at least one hydraulic plug-in connection having a plug connector and a plug socket, the plug connector including an abutment made of a first material and a sealing element made of a second material, the abutment integrally joined with the sealing element.

2. The hydraulic system as recited in claim 1, wherein the hydraulic system is part of a motor vehicle.

3. The hydraulic system as recited in claim 1, wherein the abutment and the sealing element are integrally joined to one another in a form-locking manner.

4. The hydraulic system as recited in claim 1, wherein the abutment includes at least one of an injection moldable plastic, a thermoplastic elastomer, a liquid silicon rubber, and a general purpose elastomer.

5. The hydraulic system as recited in claim 1, wherein the plug connector includes one of an external bead and an inner bead integrally molded on the sealing element.

6. The hydraulic system as recited in claim 1, wherein the plug connector includes an annular groove and further comprising a clamping spring engaged in the annular groove, wherein the plug connector and the plug socket are connectable.

7. The hydraulic system as recited in claim 6, wherein the plug connector and the plug socket are connectable in a positive locking manner.

8. The hydraulic system as recited in claim 1, wherein the first material has a first color and the second material has a second color.

* * * * *